US008225372B2

(12) United States Patent  (10) Patent No.: US 8,225,372 B2
Desai et al.  (45) Date of Patent: Jul. 17, 2012

(54) CUSTOMIZING POLICIES FOR PROCESS PRIVILEGE INHERITANCE

(75) Inventors: Saurabh Desai, Austin, TX (US); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/145,745

(22) Filed: Jun. 25, 2008

(65) Prior Publication Data
US 2009/0328129 A1  Dec. 31, 2009

(51) Int. Cl.
*G06F 21/00* (2006.01)
(52) U.S. Cl. ............................... 726/1; 726/17; 726/26
(58) Field of Classification Search .................. 726/1–7, 726/16–19, 26–29
See application file for complete search history.

(56) References Cited

U.S. PATENT DOCUMENTS

| | | | |
|---|---|---|---|
| 5,335,346 A | 8/1994 | Fabbio | 711/163 |
| 6,023,765 A | 2/2000 | Kuhn | 726/4 |
| 6,988,280 B2 | 1/2006 | Burnett | 726/17 |
| 2002/0010768 A1* | 1/2002 | Marks et al. | 709/223 |
| 2002/0091819 A1* | 7/2002 | Melchione et al. | 709/224 |
| 2003/0200436 A1 | 10/2003 | Eun et al. | 713/172 |
| 2007/0005961 A1* | 1/2007 | Hamblin et al. | 713/167 |
| 2007/0043943 A1* | 2/2007 | Peretti | 713/167 |
| 2007/0282800 A1* | 12/2007 | England et al. | 707/3 |
| 2008/0086738 A1 | 4/2008 | Nieminen | 719/328 |
| 2008/0134286 A1* | 6/2008 | Amdur et al. | 726/1 |
| 2008/0163335 A1* | 7/2008 | Hagstrom | 726/1 |
| 2008/0256606 A1 | 10/2008 | Koikara et al. | 726/4 |
| 2009/0007249 A1* | 1/2009 | Lu et al. | 726/9 |
| 2009/0187964 A1* | 7/2009 | Kao et al. | 726/1 |

FOREIGN PATENT DOCUMENTS

WO   WO2006/005812 A2   1/2006

OTHER PUBLICATIONS

Langford et al., "Compatibility of a Granular Privilege Mechanism with Setuid Programs," IBM Technical Disclosure Bulletin, Mar. 1992.
Langford et al., "Privilege Control Mechanism for UNIX Systems.," IBM Technical Disclosure Bulletin, Dec. 1991.
Office Action for co-pending U.S. Appl. No. 12/036,318, mailed Feb. 18, 2011, 18 pages.
Fernandez, EB, "Structure for Security Administration," IBM Technical Disclosure Bulletin, Nov. 1978, p. 2527-2528.
Bennett, RB, "Object Management System," IBM Technical Disclosure Bulletin, Oct. 1975, p. 1356-1360.
Office Action for U.S. Appl. No. 12/036,318, mailed Aug. 31, 2011, 19 pages.

* cited by examiner

*Primary Examiner* — Gilberto Barron, Jr.
*Assistant Examiner* — Malcolm Cribbs
(74) *Attorney, Agent, or Firm* — Van Leeuwen & Van Leeuwen; David A. Mims, Jr.

(57) ABSTRACT

An approach is provided that uses policies to determine which parental privileges are inherited by the parent's child processes. A parent software process initializes a child software process, such as by executing the child process. The parent process is associated with a first set of privileges. The inheritance policies are retrieved that correspond to the parent process. A second set of privileges is identified based on the retrieved inheritance policies, and this second set of privileges is applied to the child software process.

14 Claims, 7 Drawing Sheets

CUSTOMIZING POLICIES FOR PROCESS PRIVILEGE INHERITANCE

GOVERNMENT RIGHTS

This invention was made with Government support under PERCS PHASE III, HR0011-07-9-0002. THE GOVERNMENT HAS CERTAIN RIGHTS IN THIS INVENTION."

BACKGROUND OF THE INVENTION

1. Technical Field

The present invention relates to a system and method that controls the privileges that a child process receives from a parent process. More particularly, the present invention relates to a system and method that uses policies that can be customized to determine the privileges that the child process inherits from its parent.

2. Description of the Related Art

Operating system access control mechanisms are intended to protect programs and data from corruption, yet still allow sharing of system resources. These access control mechanisms attempt to support a broad range of authorization policies. While useful in limiting users and applications from accessing critical, or sensitive, processes and data, these access control mechanisms are implemented and largely fixed in an operating system. Today, large complex software applications, often with many layers and functions, execute on operating system. However, due to current operating system design, these applications are forced to use the same fixed privileges setup by the operating system. Privileges directed at a particular application are not supported.

In past generations, the operating system was the sole resource used by programs and processes for communication and synchronization. However, as mentioned above, very large application programs, such as IBM's Websphere™ application, are taking on responsibilities formerly performed exclusively by the operating system. As mentioned before, these large applications are forced to use the same set of privileges used by the operating system. Large, complex software applications, such as IBM's Websphere™, are increasingly being structured in terms of a base and a set of extensions which augment the functionality of the base. These complex applications often implement communication and synchronization activities between the base and the extensions without relying upon the operating system.

In addition to the increasing complexity and functionality of software applications, many current operating systems are no longer small, simplistic systems. Instead, current operating systems, even those running on a stand-alone workstations or personal computers, are often extremely complex. For this reason, associating the access control mechanism, such as privileges, solely with an operating system interface makes less sense today than in years past.

A misbehaving process generally has the potential to compromise the base system it extends because extensions are typically executed in the same address space and with the same privileges as the base and, therefore, have access to resources on which the base depends. Moreover, once compromised, a process having been granted operating system level privileges might wreck havoc on a system by abusing its privileges. This can either be in the form of processes that have bugs or logic errors that cause unforeseen difficulties to malevolent processes, such as viruses, that deliberately abuse and thwart access control mechanisms in order to disrupt, or even damage, the computer system.

SUMMARY

It has been discovered that the aforementioned challenges are resolved by an approach that uses policies to determine which parental privileges are inherited by the parent's child processes. A parent software process initializes a child software process, such as by executing the child process. The parent process is associated with a first set of privileges. The inheritance policies are retrieved that correspond to the parent process. A second set of privileges is identified based on the retrieved inheritance policies, and this second set of privileges is applied to the child software process.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
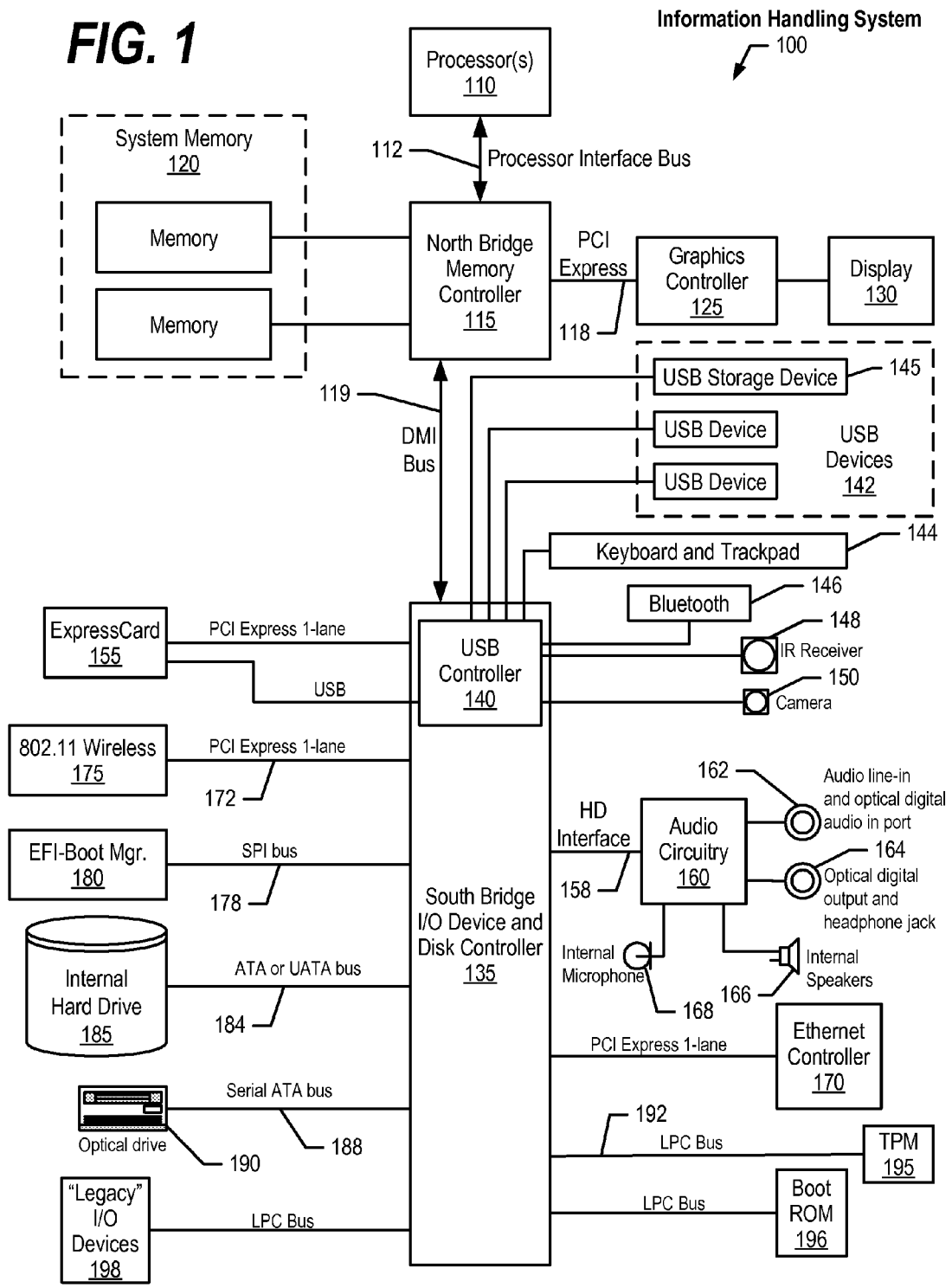
FIG. 1 is a block diagram of a data processing system in which the methods described herein can be implemented.
Figure 2:
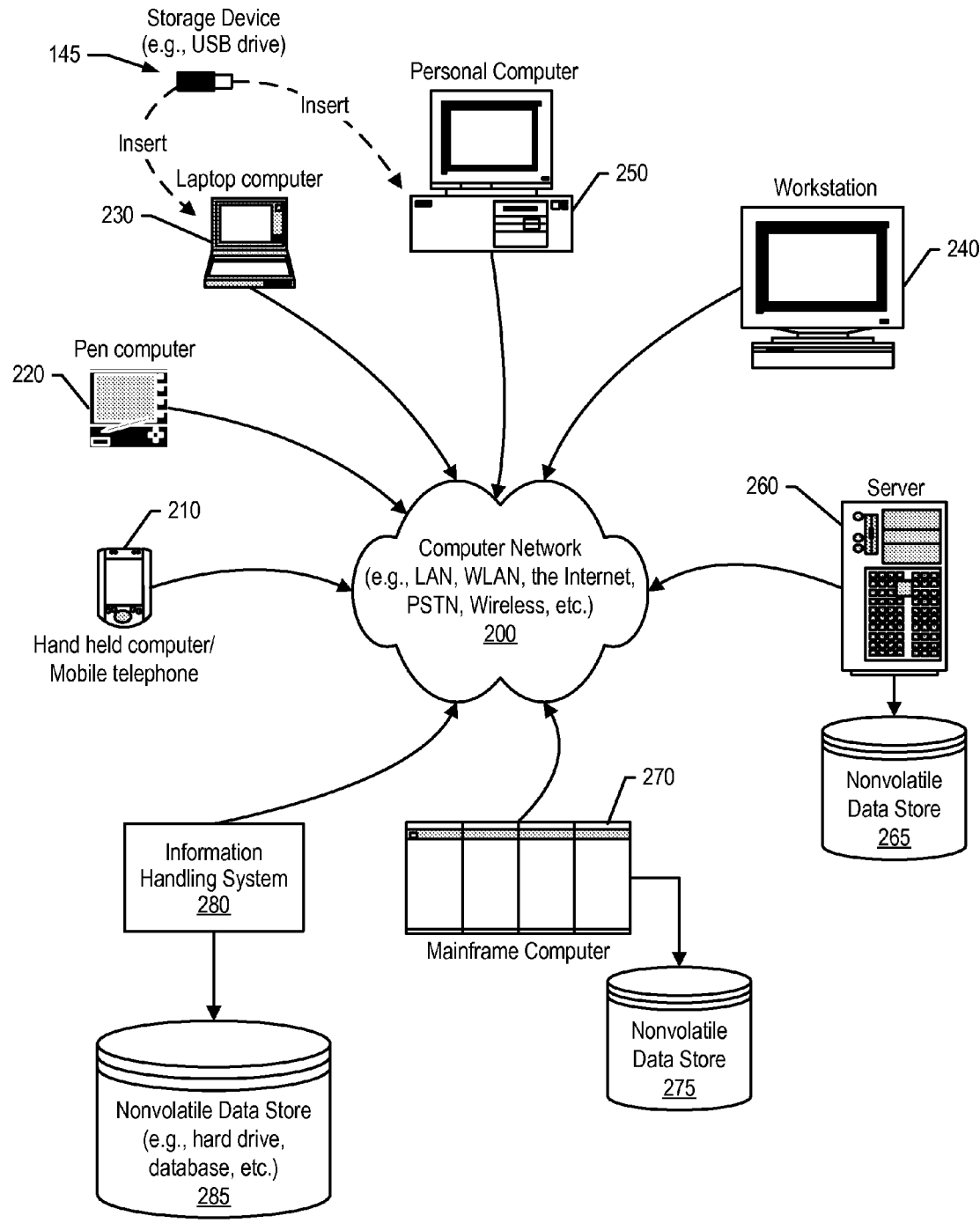
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
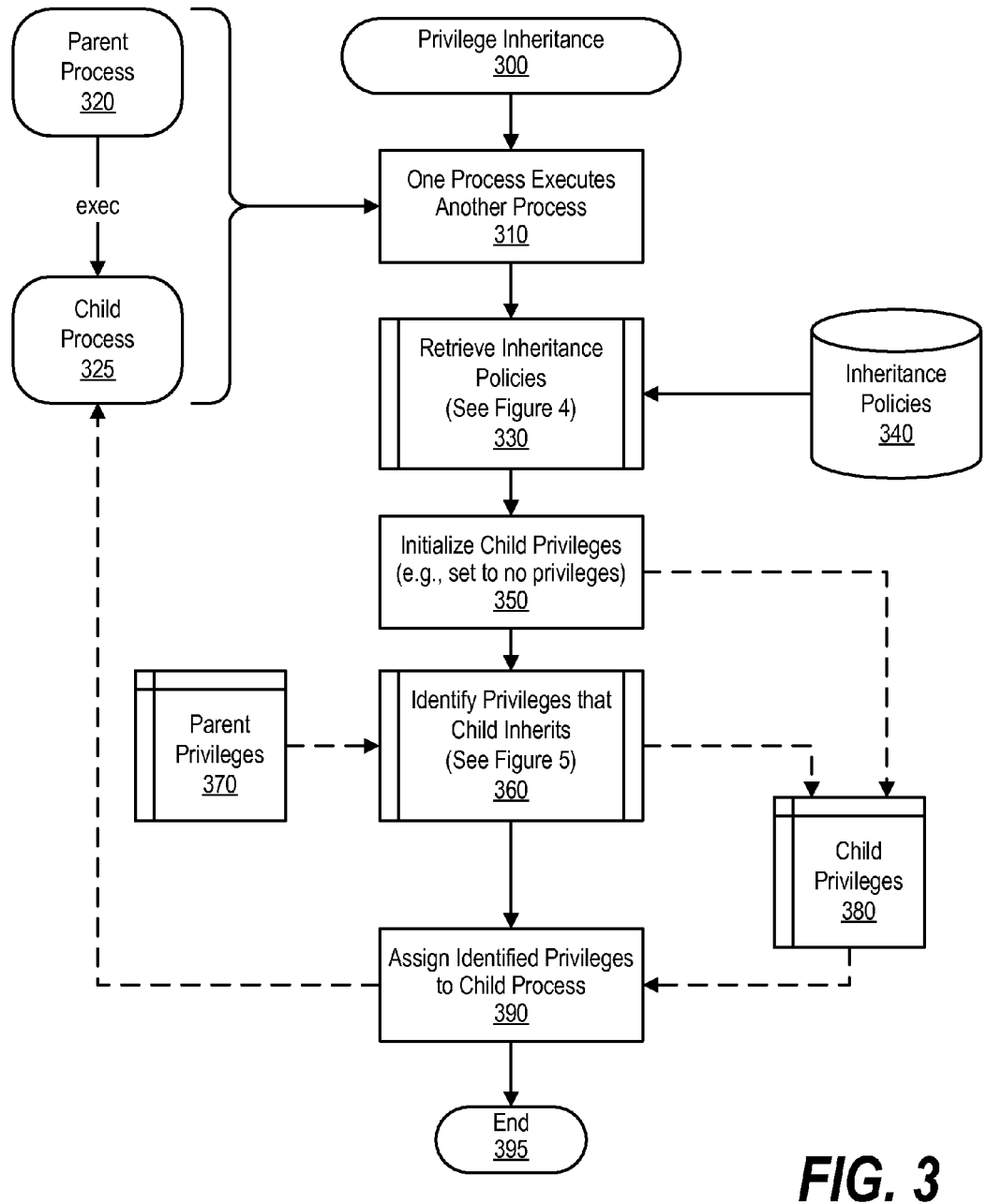
FIG. 3 is a high-level flowchart showing the privilege inheritance from a parent process to a child process.

FIG. 3 is a high-level flowchart showing the privilege inheritance from a parent process to a child process. Processing commences at 300 whereupon, at step 310, one process (parent process 320) executes another process (child process 325). When this occurs, the operating system (e.g., the kernel or the subsystem that handles process privileges), retrieves the inheritance privileges that apply from inheritance privileges policies 340 (predefined process 330, see FIG. 4 and corresponding text for processing details). At step 350, the child privileges are initialized. In one embodiment, the privileges are set to no privileges while in another embodiment, the child privileges are set to a minimum set of privileges.

Figure 5:
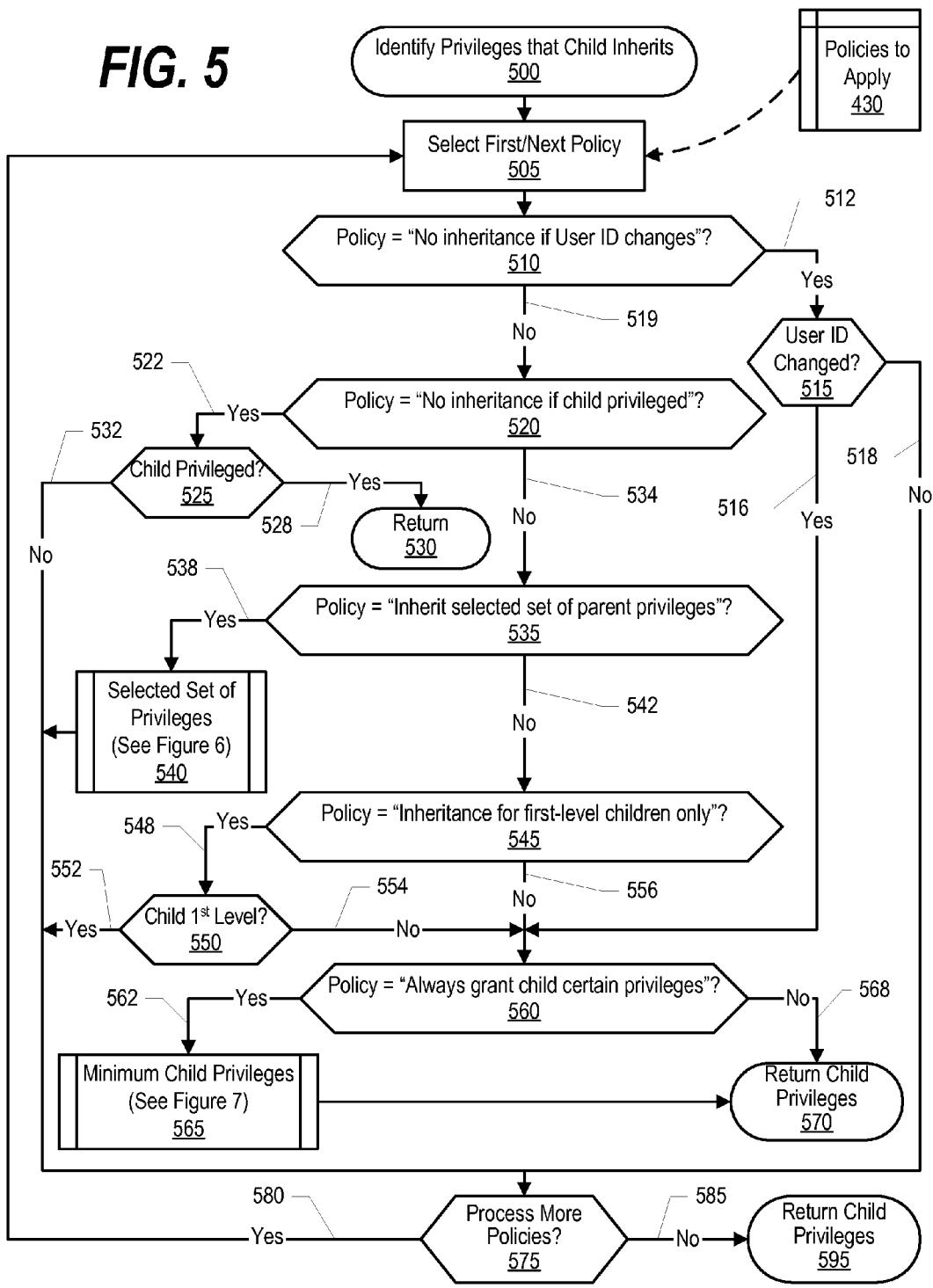
FIG. 5 is a flowchart showing steps taken to identify particular privileges that a child process inherits based upon the identified policies.

At predefined process 360, the system identifies the specific privileges that the child process inherits based upon the identified inheritance policies that apply to the parent and/or child processes (see FIG. 5 and corresponding text for processing details). During this process, identified parent privileges 370 are applied to the child process and added to child privileges 380. The privileges added to child privileges 380 are assigned to the child process at step 390 (e.g., after the specific privileges that are being inherited have been identified). Processing thereafter ends at 395.

Figure 4:
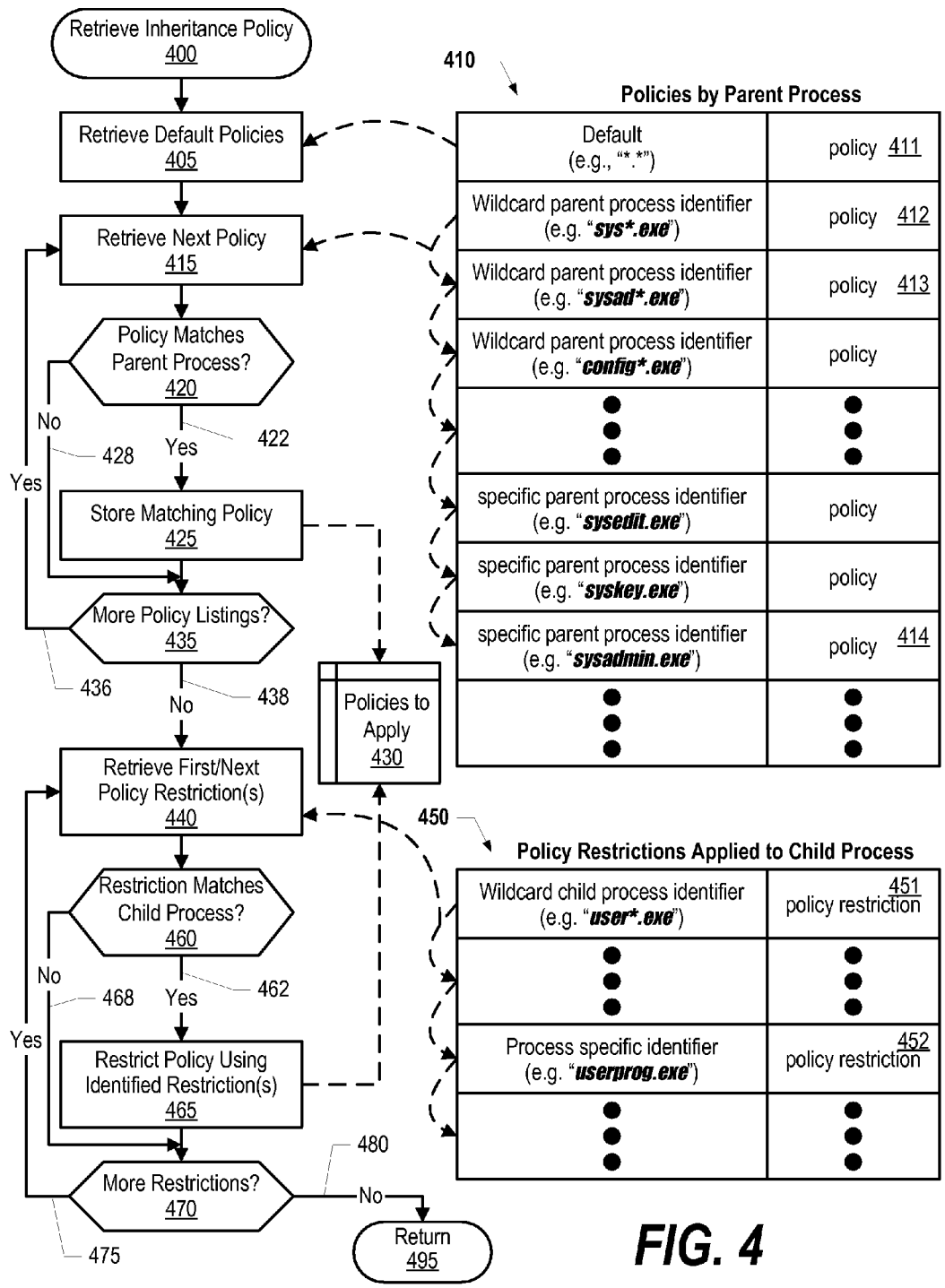
FIG. 4 is a flowchart and policies registry showing steps taken to retrieve a privilege inheritance policy that applies to a parent process that is initiating a child process.

FIG. 4 is a flowchart and policies registry showing steps taken to retrieve a privilege inheritance policy that applies to a parent process that is initiating a child process. Processing to retrieve the inheritance policy (or policies) that determine which privileges apply to the child process commences at 400. At step 405, any default policies are retrieved from policies data store 410, such as a nonvolatile memory (e.g., hard disk, etc.) or random access memory area (RAM). At step 415, the next policy listing is retrieved from policy registry 410. Policy registry 410 stores process listings and associated policies. Policy registry 410 is a data store that can be in a variety of formats, such as a database, a flat file, etc. The process listings are shown in the left column of policy registry 410 and, as shown in the example, may include wildcard characters. In one embodiment, the process listings are processed from broadest (e.g., "default," or "*.*") to specific process identifiers (e.g., "systeminfo.exe," etc.). A determination is made as to whether the retrieved policy listing (e.g., "sys*.exe") matches the parent process identifier (decision 420). If they match (either a direct match or by using any wildcards found), then decision 420 branches to "yes" branch 422 whereupon, at step 425, the matching inheritance policy is stored in data store 430. On the other hand, if they do not match, then decision 420 branches to "no" branch 428 bypassing step 425. A determination is then made as to whether there are more policy listings to process (decision 435). If there are more policy listings to process, then decision 435 branches to "yes" branch 436 which loops back to retrieve and process the next policy listing from registry 410.

This looping continues until the policy listings in policy registry 410 have been processed, at which time decision 435 branches to "no" branch 438.

Using the example listings shown in registry 410, if a parent process has a parent process identifier of "system.exe" and it is executing (e.g., spawning, forking, etc.) a new child process, then processing would first load any default policies (see step 405 above) and would then compare process listings from registry 410 to the process identifier "system.exe". In this case, the first entry would match ("sys*.exe") but none of the other entries shown in registry 410 would match so only policy 411 (the default policy) and policy 412 would be retrieved. Likewise, if the parent process identifier is "systadmin.exe", then this process identifier would cause the retrieval of default policy 411, policy 412 (because "systadmin.exe" matches with "sys*.exe"), policy 413 (because "systadmin.exe" also matches with "sysad*.exe"), and policy 414 (because "systadmin.exe" matches specific process identifier "systadmin.exe").

Policy restrictions are available to redact, or remove, any privileges that might be granted to a child process based on the child's process identifier. For example, if, based on the parent's process identifier, one of the policies retrieved allows the child process to execute (e.g., spawn, fork, etc.) additional child processes (grandchildren of the parent), but this specific child process should not be granted this privilege, then a policy restriction can be created to remove privileges so that certain privileges are not granted (applied) to this specific child. For example, if a process named "userprog.exe" should have certain restrictions applied, then these policy restrictions are listed in restriction registry 450. Restriction registry 450 is similar to policies registry 410 except that restriction registry 450 includes policy restrictions rather than policies and restriction registry 450 matches against the child process identifier whereas policy registry 410 matches against the parent process identifier.

At step 440, the first policy restriction listing is retrieved from restriction registry 450. Restriction registry 450 is a data store that can be in a variety of formats, such as a database, a flat file, etc. The process listings are shown in the left column of restriction registry 450 and, as shown in the example, may include wildcard characters. In one embodiment, the process listings are processed from broadest (e.g., "*.*") to specific process identifiers (e.g., "userprog.exe," etc.). A determination is made as to whether the retrieved restriction listing (e.g., "user*.exe") matches the parent process identifier (decision 460). If they match (either a direct match or by using any wildcards found), then decision 460 branches to "yes" branch 462 whereupon, at step 465, the matching policy restriction (e.g., policy restriction 451) is applied to the policies stored in data store 430. On the other hand, if they do not match, then decision 460 branches to "no" branch 468 bypassing step 465. A determination is then made as to whether there are more restriction listings to process (decision 470). If there are more policy listings to process, then decision 470 branches to "yes" branch 475 which loops back to retrieve and process the next restriction listing from restriction registry 450. This looping continues until the policy restrictions in restriction registry 450 have been processed, at which time decision 470 branches to "no" branch 480 and processing returns to the calling process (e.g., FIG. 3) at 495.

FIG. 5 is a flowchart showing steps taken to identify particular privileges that a child process inherits based upon the identified policies. The processing performed in FIG. 5 occurs after the policies have been identified and retrieved using the steps shown in FIG. 4. FIG. 5 processing commences at 500 whereupon, at step 505, the first policy is selected from policies data store 430. A determination is made as to whether a policy was added so that this child process does not inherit any privileges from the parent process if the user identifier has changed (decision 510, such as the user ID changing after the parent process was invoked). If the policy is applied so that this child process does not inherit any privileges from the parent process if the user identifier has changed, then decision 510 branches to "yes" branch 512 whereupon a determination is made as to whether the user identifier has changed since the parent process was invoked (decision 515). If the user identifier has changed, then decision 515 branches to "yes" branch 516 whereupon a determination is made as to whether a policy has been established to grant the child a minimum set of privileges (decision 560). If a policy has been established to grant the child a minimum set of privileges, then decision 560 branches to "yes" branch 562 whereupon, at predefined process 565, the minimum set of child privileges are granted and the process returns to the calling routine at 570. On the other hand, if a policy has not been established to grant child processes a minimum set of privileges, then decision 560 branches to "no" branch 568 bypassing predefined process 565 and the process returns to the calling routine at 570.

Returning to decision 515, if the user identifier has not changed then decision 515 branches to "no" branch 518 whereupon a determination is made as to whether there are more policies to process (decision 575). If there are more policies to process, then decision 575 branches to "yes" branch 580 which loops back to select the next policy (back at step 505), and the next selected policy is processed. This looping continues until there are no more policies to select and process, at which point decision 575 branches to "no" branch 585 and processing thereafter returns to the calling routine at 595.

Returning to decision 510, if the selected inheritance policy is not a "no inheritance if user identifier changes" policy, then decision 510 branches to "no" branch 519 whereupon a determination is made as to whether the selected policy is "no inheritance if the child process is a privileged process" (decision 520). If the selected inheritance policy is "no inheritance if the child process is a privileged process," then decision 520 branches to "yes" branch 522 whereupon a determination is made as to whether the child process is a privileged process (decision 525). If the child process is a privileged process, then decision 525 branches to "yes" branch 528 whereupon processing returns to the calling routine at 530 without the child inheriting any additional privileges from the parent process. On the other hand, if the child is not a privileged process, then decision 525 branches to "no" branch 532 whereupon, as described above, decision 575 determines whether there are more policies to process and processing loops back to process the next policy if there are more policies to process (decision 575 branches to "yes" branch 580) or returns to the calling routine if there are no more policies to select and process.

Returning to decision 520, if the policy is not "no inheritance if the child process is a privileged process," then decision 520 branches to "no" branch 534 whereupon a determination is made as to whether the selected policy is to inherit a selected set of privileges from the parent process (decision 535). If the selected policy is to inherit a selected set of privileges from the parent process, then decision 535 branches to "yes" branch 538 whereupon, at predefined process 540, a set of privileges are selected from the parent process according to the policy (see FIG. 6 and corresponding text for processing details). Returning to decision 535, if the selected policy is not to inherit a selected set of privileges from the parent process, then decision 535 branches to "no" branch 542 whereupon a determination is made as to whether the selected policy is to allow inheritance from the parent process only for first level children (decision 545). In other words, this policy would allow a direct child of the process to inherit privileges but would not allow a process of one of the child processes (e.g., a "grandchild," etc. of the parent process) to inherit privileges from the parent. If the selected policy is "Inheritance for first-level children only," then decision 545 branches to "yes" branch 548 whereupon a determination is made as to whether this child is a first-level child of the parent process (decision 550). If the process is a first-level child, then decision 550 branches to "yes" branch 552 whereupon, as previously described, decision 575 determines whether there are more policies to process and processing loops back to process the next policy if there are more policies to process (decision 575 branches to "yes" branch 580) or returns to the calling routine if there are no more policies to select and process. Returning to decision 550, if the child is not a first-level child, then decision 550 branches to "no" branch 554 whereupon decision 560 is performed as described above which may result in predefined process 565 being performed to grant the non-first-level child process a minimum set of privileges, and processing returns to the calling routine at 570.

Having benefit of the techniques described herein, those skilled in the art will appreciate the flexibility of granting privileges to child processes using additional policies not described herein. While the policies described herein may be useful in certain operating environments, policies may be removed from an environment or added to an environment based upon the needs in assigning privileges to child processes. In other words, more policies, or different policies, can be added based on the requirements or needs of the organization implementing the customized policies that determine privilege inheritance as described herein.

Figure 6:
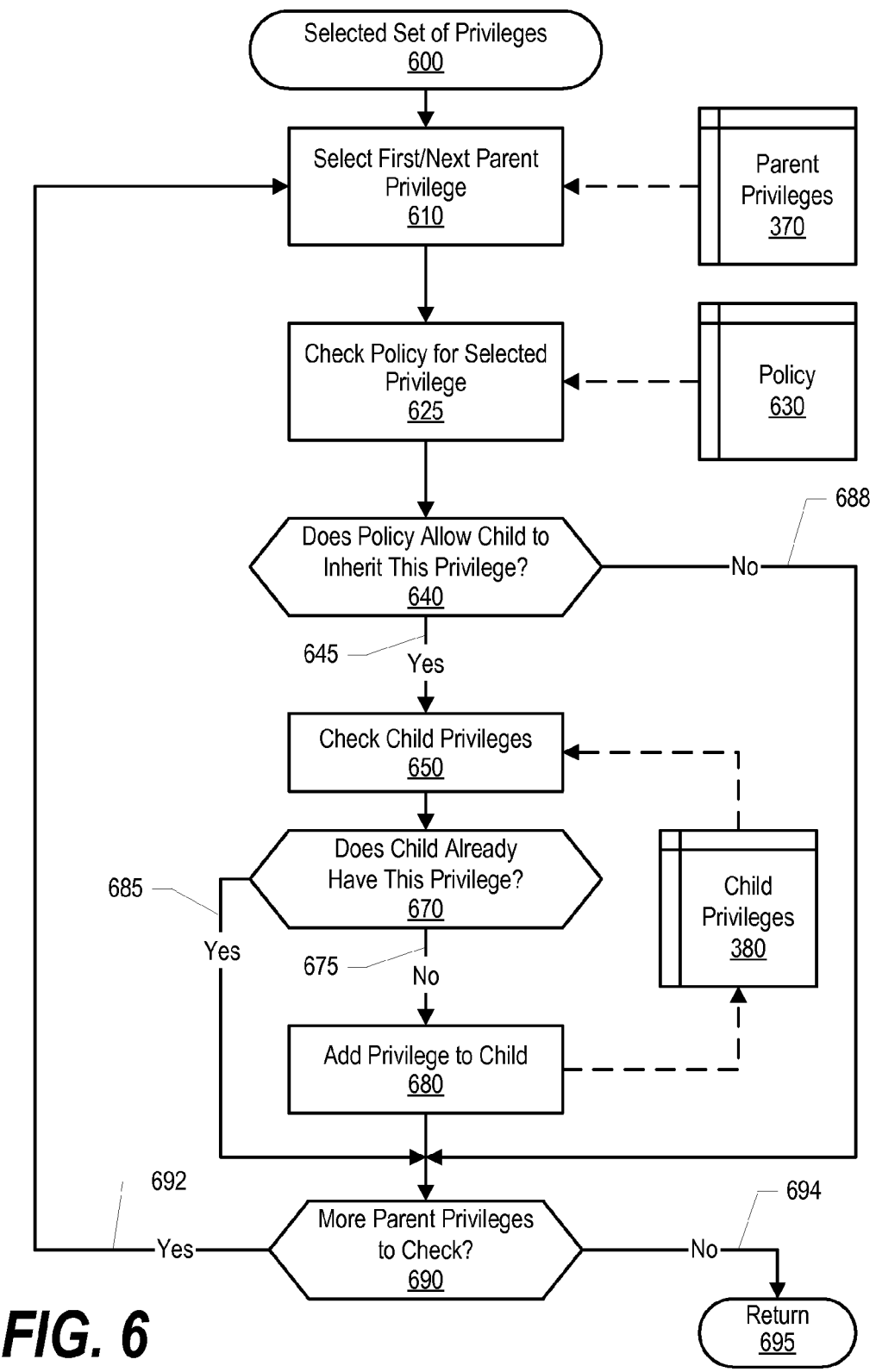
FIG. 6 is a flowchart showing steps taken to assign privileges to a child process based on inheritance and the identified policies.

FIG. 6 is a flowchart showing steps taken to assign privileges to a child process based on inheritance and the identified policies. Processing commences at 600 whereupon, at step 610, the first privilege assigned to the parent process is selected from parent privileges memory area 370. At step 625, the policy used to select the set of parental privileges that the child inherits (policy 630) is checked to see if the selected privilege is one of the privileges that can be inherited. A determination is made as to whether policy 630 allows the child process to inherit the selected privilege (decision 640). If the policy allows the child to inherit the selected privilege, then decision 640 branches to "yes" branch 645 whereupon, at step 650, a check is made of the privileges currently assigned to the child process and stored in child privileges memory area 380. A determination is made as to whether the child has already been assigned the selected privilege (decision 670). If the child has not already been assigned the selected privilege, then decision 670 branches to "no" branch 675 whereupon, at step 680, the selected privilege is added to the set of child privileges and stored in child privileges memory area 380. On the other hand, if the child process has already been assigned the selected privilege, then decision 670 branches to "yes" branch 685 bypassing step 680.

A determination is made as to whether there are more parental privileges stored in parent privileges memory area 370 that need to be checked against the policy (decision 690). If there are more parental privileges to check, then decision 690 branches to "yes" branch 692 which loops back to select the next parental privilege from memory area 370 and process the next selected privilege as described above. This looping continues until there are no more parental privileges to check, at which point decision 690 branches to "no" branch 694 and processing returns to the calling routine (e.g., shown in FIG. 5) at 695.

Figure 7:
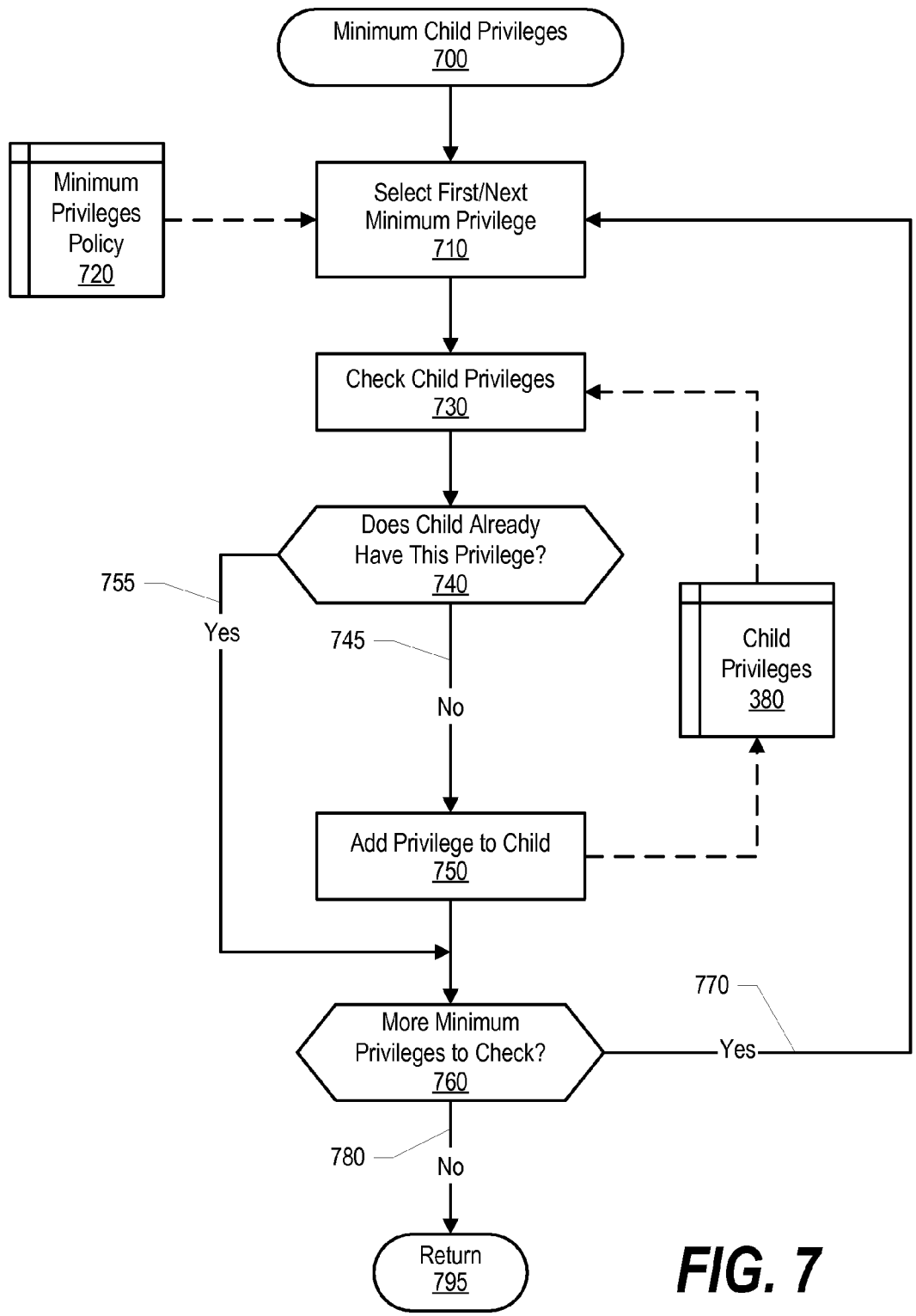
FIG. 7 is a flowchart showing steps taken to grant child processes minimum privileges based on a minimum privileges policy.

FIG. 7 is a flowchart showing steps taken to grant child processes minimum privileges based on a minimum privileges policy. Processing commences at 700 whereupon, at step 710, the first privilege is selected from minimum privileges policy 720. At step 730, privileges that have already been assigned to the child process and stored in child privileges memory are 380 are checked to see if the selected minimum privilege has already been assigned to the child process (e.g., the privilege may have already been assigned to the child process because of another policy that applied and that was processed in accordance with the flowchart shown in FIG. 5). A determination is made as to whether the child has already been assigned the selected privilege (decision 740). If the child has not already been assigned the selected privilege, then decision 740 branches to "no" branch 745 whereupon, at step 750, the selected privilege is added to the set of child privileges and stored in child privileges memory area 380. On the other hand, if the child process has already been assigned the selected privilege, then decision 740 branches to "yes" branch 755 bypassing step 750.

A determination is made as to whether there are more privileges in the minimum privileges policy that need to be checked and possibly assigned to the child process (decision 760). If there are more privileges in the minimum privileges policy to check, then decision 760 branches to "yes" branch 770 which loops back to select the next parental privilege from minimum privileges policy 720 and process the next selected privilege as described above. This looping continues until there are no more privileges in the minimum privileges policy to check, at which point decision 760 branches to "no" branch 780 and processing returns to the calling routine (e.g., shown in FIG. 5) at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    initializing, by a parent software process, a child software process;
    retrieving one or more inheritance policies associated with the parent software process, wherein the one or more inheritance policies correspond with a first set of one or more privileges;
    identifying one or more policy restrictions that correspond to the child software process;
    applying the identified one or more policy restrictions to the one or more inheritance policies, the applying resulting in a second set of one more privileges;
    retrieving one or more minimum privileges based upon a minimum privileges policy;
    identifying one or more of the minimum privileges that fail to be included in the second set of privileges;
    adding the identified one or more minimum privileges, which fail to be included in the second set of privileges, to the second set of privileges, resulting in a revised second set of privileges; and
    assigning the revised second set of privileges to the child software process.

2. The method of claim 1 wherein the one or more inheritance policies that are retrieved based on the parent software are retrieved after retrieving a default inheritance policy.

3. The method of claim 1 wherein a selected one of the retrieved inheritance policies is "inherit a selected set of privileges" and the method further comprises:
    retrieving the selected set of privileges;
    comparing the selected set of privileges with the first set of one or more privileges; and
    adding one or more of the selected set of privileges to the second set of privileges in response to the comparing revealing that the selected set of privileges are included in the first set of privileges.

4. The method of claim 1 further comprising:
    comparing a parent process identifier that corresponds to the parent software process to a plurality of policy listings included in a registry, wherein each policy listing includes one of the inheritance policies and a process listing, wherein one or more of the process listings include wildcard characters;
    identifying one or more matches of the parent process identifier to the process listings based on the comparison; and
    retrieving the inheritance policies from the policy listings where matches were identified between the process listings and the parent process identifier.

5. The method of claim 1 further comprising:
    comparing a child process identifier that corresponds to the child software process to a plurality of policy restriction listings included in a registry, wherein each policy restriction listing includes a process listing, wherein one or more of the process listings include wildcard characters;

identifying one or more matches of the child process identifier to the process listings based on the comparison; and in response to identifying the one or more matches of the child process identifier to the process listings, retrieving the identified one or more policy restrictions, the identified one or more policy restrictions corresponding to the matched process listings.

6. A information handling system comprising:

one or more processors;

a memory accessible by at least one of the processors;

a nonvolatile storage area accessible by at least one of the processors;

a set of instructions stored in the memory and executed by at least one of the processors in order to perform actions of:

initializing, by a parent software process, a child software process;

retrieving one or more inheritance policies associated with the parent software process, wherein the one or more inheritance policies correspond with a first set of one or more privileges;

identifying one or more policy restrictions that correspond to the child software process;

applying the identified one or more policy restrictions to the one or more inheritance policies, the applying resulting in a second set of one more privileges;

retrieving one or more minimum privileges based upon a minimum privileges policy;

identifying one or more of the minimum privileges that fail to be included in the second set of privileges;

adding the identified one or more minimum privileges, which fail to be included in the second set of privileges, to the second set of privileges, resulting in a revised second set of privileges; and assigning the revised second set of privileges to the child software process.

7. The information handling system of claim 6 wherein the one or more inheritance policies that are retrieved based on the parent software are retrieved after retrieving a default inheritance policy.

8. The information handling system of claim 6 wherein the set of instructions, when executed, cause at least one of the processors to perform further actions comprising:

comparing a parent process identifier that corresponds to the parent software process to a plurality of policy listings included in a first registry, wherein each policy listing includes one of the inheritance policies and a process listing, wherein one or more of the process listings include wildcard characters;

identifying one or more matches of the parent process identifier to the process listings based on the comparison;

retrieving the inheritance policies from the policy listings where matches were identified between the process listings and the parent process identifier;

comparing a child process identifier that corresponds to the child software process to a plurality of policy restriction listings included in a second registry, wherein each policy restriction listing includes a process listing, wherein one or more of the process listings include wildcard characters;

identifying one or more matches of the child process identifier to the process listings based on the comparison; and in response to identifying the one or more matches of the child process identifier to the process listings, retrieving the identified one or more policy restrictions, the identified one or more policy restrictions corresponding to the matched process listings.

9. The information handling system of claim 6 wherein the set of instructions, when executed, cause at least one of the processors to perform further actions comprising:

comparing a child process identifier that corresponds to the child software process to a plurality of policy restriction listings included in a registry, wherein each policy restriction listing includes a process listing, wherein one or more of the process listings include wildcard characters;

identifying one or more matches of the child process identifier to the process listings based on the comparison; and in response to identifying the one or more matches of the child process identifier to the process listings, retrieving the identified one or more policy restrictions, the identified one or more policy restrictions corresponding to the matched process listings.

10. A computer program product stored in a non-transitory computer readable medium, comprising functional descriptive material that, when executed by an information handling system, causes the information handling system to perform actions that include:

initializing, by a parent software process, a child software process;

retrieving one or more inheritance policies associated with the parent software process, wherein the one or more inheritance policies correspond with a first set of one or more privileges;

identifying one or more policy restrictions that correspond to the child software process;

applying the identified one or more policy restrictions to the one or more inheritance policies, the applying resulting in a second set of one more privileges;

retrieving one or more minimum privileges based upon a minimum privileges policy;

identifying one or more of the minimum privileges that fail to be included in the second set of privileges;

adding the identified one or more minimum privileges, which fail to be included in the second set of privileges, to the second set of privileges, resulting in a revised second set of privileges; and assigning the revised second set of privileges to the child software process.

11. The computer program product of claim 10 wherein the one or more inheritance policies that are retrieved based on the parent software are retrieved after retrieving a default inheritance policy.

12. The computer program product of claim 10 wherein a selected one of the retrieved inheritance policies is "inherit a selected set of privileges" and the descriptive material causes the data processing system to perform additional actions that include:

retrieving the selected set of privileges;

comparing the selected set of privileges with the first set of one or more privileges; and adding one or more of the selected set of privileges to the second set of privileges in response to the comparing revealing that the selected set of privileges are included in the first set of privileges.

13. The computer program product of claim 10 further comprising functional descriptive material that causes the data processing system to perform additional actions that include:

comparing a parent process identifier that corresponds to the parent software process to a plurality of policy listings included in a registry, wherein each policy listing includes one of the inheritance policies and a process listing, wherein one or more of the process listings include wildcard characters;

identifying one or more matches of the parent process identifier to the process listings based on the comparison; and retrieving the inheritance policies from the policy listings where matches were identified between the process listings and the parent process identifier.

14. The computer program product of claim 10 further comprising functional descriptive material that causes the data processing system to perform additional actions that include:

comparing a child process identifier that corresponds to the child software process to a plurality of policy restriction listings included in a registry, wherein each policy restriction listing includes a process listing, wherein one or more of the process listings include wildcard characters;

identifying one or more matches of the child process identifier to the process listings based on the comparison; and in response to identifying the one or more matches of the child process identifier to the process listings, retrieving the identified one or more policy restrictions, the identified one or more policy restrictions corresponding to the matched process listings.

* * * * *